United States Patent
Parmar et al.

(10) Patent No.: US 11,626,712 B1
(45) Date of Patent: Apr. 11, 2023

(54) DISCONNECTOR HAVING ADDITIONAL HOLDING FORCES

(71) Applicant: EATON INTELLIGENT POWER LIMITED, Dublin (IE)

(72) Inventors: Vinod Parmar, Pune (IN); Dinant Johan Heilersig, Markelo (NL); Hilbert Gezienus Knol, Hengelo (NL)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/567,288

(22) Filed: Jan. 3, 2022

(51) Int. Cl.
  *H02B 1/20* (2006.01)
  *H01H 33/02* (2006.01)
  *H01H 33/666* (2006.01)

(52) U.S. Cl.
  CPC .......... *H02B 1/20* (2013.01); *H01H 33/6661* (2013.01); *H01H 33/022* (2013.01)

(58) Field of Classification Search
  CPC .... H01H 33/6661; H01H 33/022; H01H 3/00; H01H 31/00; H02B 1/20
  USPC ............. 218/3–6, 12, 45, 55, 79, 80, 100; 200/15, 16 F, 48 KB, 48 A, 407, 254
  See application file for complete search history.

(56) References Cited

U.S. PATENT DOCUMENTS

| | | | | |
|---|---|---|---|---|
| 2,836,688 A * | 5/1958 | Florschutz | ........... | H01H 1/5833 439/31 |
| 3,824,359 A * | 7/1974 | Date | .................... | H01H 33/127 218/10 |
| 5,013,876 A * | 5/1991 | Chabala | .................... | H01H 1/42 200/254 |
| 8,717,741 B2 * | 5/2014 | Valenzuela | ............ | H01R 35/04 361/624 |
| 9,466,955 B2 * | 10/2016 | Saxegaard | ......... | H02B 13/0352 |
| 9,679,724 B2 * | 6/2017 | Abrahamsen | ........ | H01H 33/128 |
| 9,691,561 B2 * | 6/2017 | West | ........................ | H01H 1/42 |
| 11,189,446 B2 * | 11/2021 | Kechroud | .......... | H01H 33/6661 |
| 2012/0300358 A1 * | 11/2012 | Johnson | .................... | H01H 3/40 29/606 |
| 2020/0303907 A1 * | 9/2020 | Kokkonen | ............... | H02B 1/20 |

* cited by examiner

*Primary Examiner* — William A Bolton
(74) *Attorney, Agent, or Firm* — Eckert Seamans Cherin & Mellott, LLC

(57) ABSTRACT

A disconnector for use in a switchgear structured to electrically connect between a power source and a load includes a pair of disconnector blades spaced apart by a distance and having a first end structured to selectively receive and form an electrical connection with a busbar contact and a second end structured to electrically couple to the load, and a pair of magnetic plates mechanically connected to inner surfaces of the pair of disconnector blades and structured to bias the pair of disconnector blades toward each other.

20 Claims, 6 Drawing Sheets

DISCONNECTOR HAVING ADDITIONAL HOLDING FORCES

FIELD OF THE INVENTION

The disclosed concept relates generally to disconnectors, and in particular, to disconnectors with disconnector blades having magnetic plates or laminated steel structured to provide additional holding forces between the disconnector blades.

BACKGROUND OF THE INVENTION

A disconnector is a mechanical switching device used for changing the connections in a circuit. It is an off-load device, typically used to isolate an electrical circuit from a power source during, e.g., maintenance. For example, it can be used in a switchgear to connect or disconnect a load from the power source during normal, abnormal or maintenance operations. A switchgear is a freestanding enclosed assembly structured to protect equipment from short circuits and fault currents, isolate electrical circuits from power supplies, and open and close the electrical circuits under normal and abnormal conditions. For operation, a disconnector is required to carry normal load current continuously and also abnormal or short-circuit currents for intervals as specified, e.g., IEEE standards. For example, a disconnector must satisfy a short-circuit current withstand capability test. A short-circuit current withstand capability is a measure of the short-circuit current a device can tolerate without being damaged when a fault occurs on the output of the device. In order to test for such capability, high current is passed in the switchgear circuit.

Current passing through disconnector blades of the same phase induces electromagnetic fields that pull the pair of disconnector blades together. Constriction forces at contact points during a short circuit event push the disconnector blades apart. Additionally, current flowing through neighboring disconnector blades connected to different phases can also pull disconnector blades apart. When the forces pulling a pair of disconnector blades apart becomes significant enough to overwhelm the forces holding them together, the connection can be compromised and the switchgear may be unable to pass a short circuit withstand test. Such failure poses a grave danger and safety hazards to the operator and any person near the switchgear. Various solutions have been presented to improve the holding performance of the disconnector blades. For example, different types of contacts and mechanisms to bring the blades closer to each other have been utilized. However, these solutions accompany additional costs and hurdles to other critical-to-quality issues such as endurance and dielectric requirement.

There is considerable room for improvement in disconnector performance.

There is considerable room for improving holding forces between disconnector blades of a switchgear.

SUMMARY OF THE INVENTION

These needs and others are met by embodiments of the disclosed concept in which a disconnector for use in a switchgear structured to electrically connect between a power source and a load is provided. The disconnector includes a pair of disconnector blades spaced apart by a distance and having a first end structured to selectively receive and form an electrical connection with a busbar contact and a second end structured to electrically couple to the load, and a pair of magnetic plates mechanically connected to inner surfaces of the pair of disconnector blades and structured to bias the pair of disconnector blades toward each other.

Another aspect of the disclosed concept provides a disconnector for use in a switchgear structured to electrically connect between a power source and a load, the disconnector including: a pair of disconnector blades spaced apart by a distance and having a first end structured to selectively receive and form an electrical connection with a busbar contact and a second end structured to electrically couple to the load, and a laminated steel disposed to enclose the pair of disconnector blades with a gap at the center and structured to bias the pair of disconnector blades toward each other.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
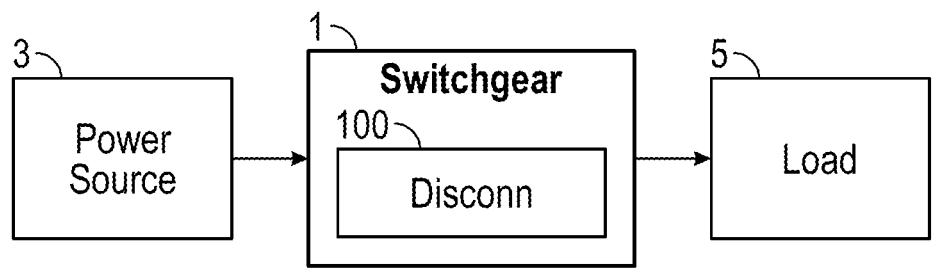
FIG. 1 is a schematic diagram of switchgear in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

FIG. 1 is a schematic diagram of switchgear 1 in accordance with an example embodiment of the disclosed concept. The switchgear 1 is electrically coupled between a power source 3 and a load 5. The switchgear 1 includes one or more disconnectors 100 structured to selectively electrically isolate the load 5 and one or more components of the switchgear 1 from the power source 3.

Figure 2:
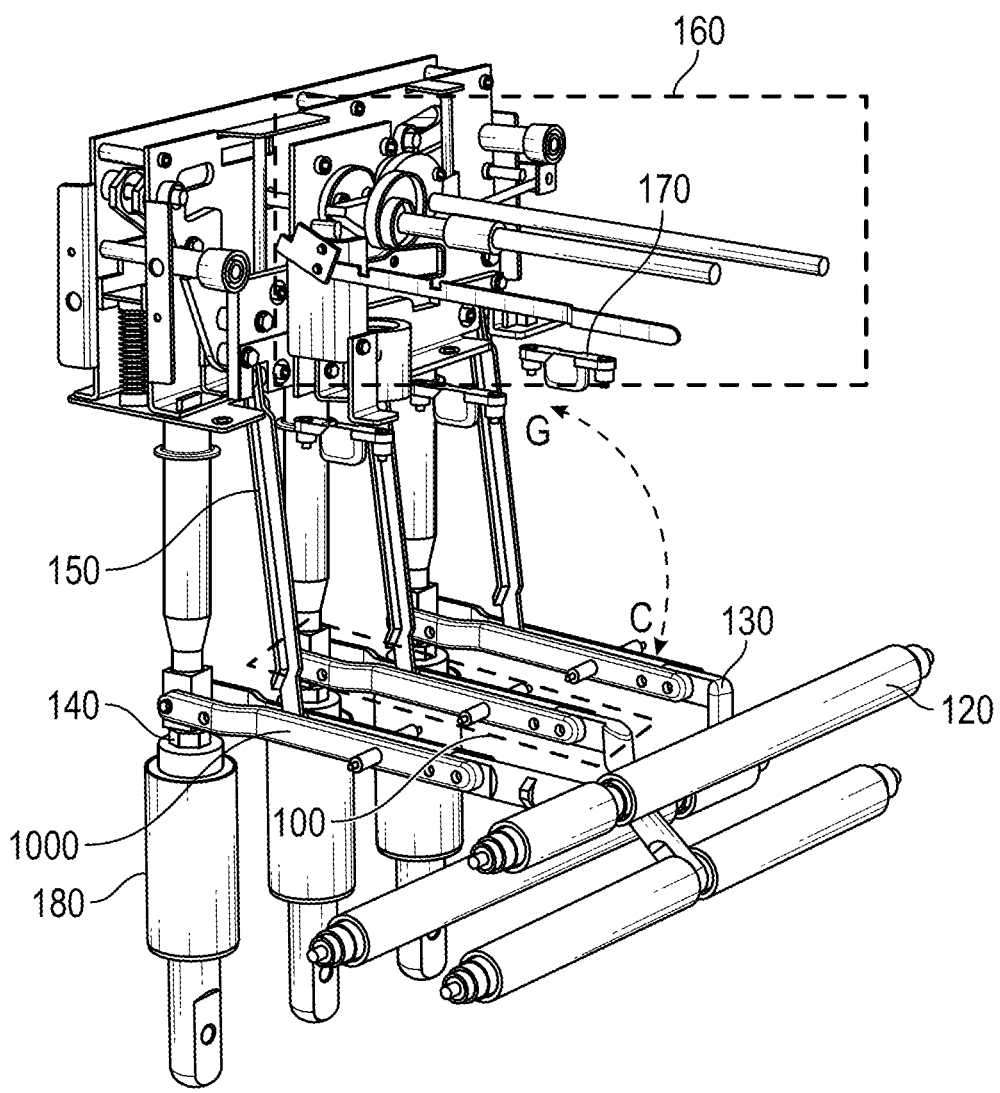
FIG. 2 is an isometric view of a disconnector for use in switchgear in accordance with an example embodiment of the disclosed concept.

FIG. 2 is an isometric view of a disconnector 100 for use in a switchgear in accordance with an example embodiment of the disclosed concept. The disconnector 100 includes a pair of disconnector blades 1000 for each phase structured to electrically couple to a power source via, e.g., connection to respective busbars 120 via respective stabs 130 at one end, and to electrically couple to a load via e.g., conductors 140, circuit breakers 180, or other components at the other end. In the example embodiment shown in FIG. 2, the ends of the stabs 130 connected to the disconnector blades 1000 are disposed in the same plane, but it will be appreciated that other arrangements may be used without departing from the scope of the disclosed concept. The disconnector blades 1000 are elongated members composed of conductive material (e.g., copper) and spaced apart from each other by a distance. The disconnector blades 1000 are structured to receive their corresponding stabs 130 at one end. The other end of the disconnector blades 1000 are structured to electrically couple to conductors 140 or other components via an electrical connection such as a hinge. The disconnector blades 1000 are structured to selectively move between closed position C in which the disconnector blades 1000 are electrically coupled to the power source via the busbars 120 and a grounded position G in which the disconnector blades 1000 are electrically connected to ground contacts 170. A lever arm 150 and an operating mechanism 160 are operable to rotate the disconnector blades 1000 between the closed and grounded positions. In the grounded position G, the circuit breaker 180 and any other downstream components from the disconnector blades 1000 are electrically isolated from the power source making them safe to service. Generally, disconnector blades 1000 are not intended to interrupt an active current and are generally only moved from the closed to the grounded position after their corresponding circuit breaker 180 has interrupted the current. As will be described further herein, disconnector blades in accordance with the disclosed concept may be employed in type of disconnector illustrated in FIG. 2. However, it will be appreciated that disconnector blades in accordance with the disclosed concept may also be employed in other types of disconnectors.

Figure 3:
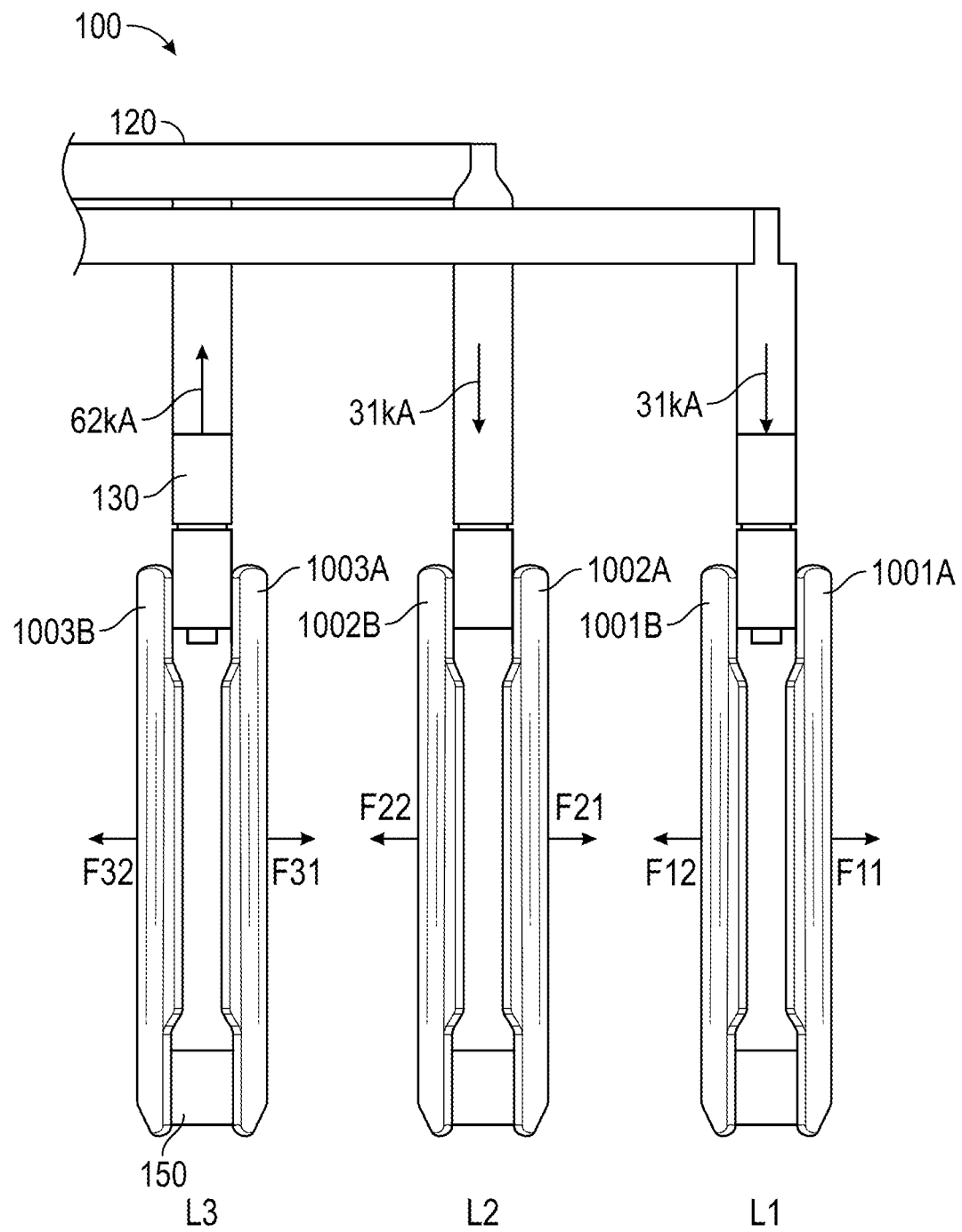
FIG. 3 is a view of the disconnector of FIG. 2 including forces acting on disconnector blades in accordance with an example embodiment of the disclosed concept.

FIG. 3 illustrates a portion of the disconnector 100 shown in FIG. 2, along with forces associated with each disconnector blade. The phase-one (L1) includes disconnector blades 1001A,B, the phase-two (L2) includes disconnector blades 1002A,B, and the phase-three (L3) includes disconnector blades 1003A,B. Each pair of disconnector blades are structured to electrically couple to corresponding busbars 120 via stabs 130. Each disconnector blade encounters electromagnetic forces. These forces include: Lorentz force as developed in the current carrying conductors (i.e., the disconnector blades), constriction force acting on each contact where the current drives the disconnector blades away from each other, and electromagnetic forces caused by other disconnector blades. The Lorentz force from a pair of disconnector blades will attract a pair of disconnector blades toward each other, while the Lorentz force from neighboring pairs of disconnector blades may cause attraction or repulsion depending on the direction of current. The constriction force will push the pair of disconnector blades away from each other, thus reducing contact force. FIG. 3 illustrates the total force on each disconnector blade. For example, disconnector blade 1001A has a total resultant force F11, disconnector blade 1001B has a total resultant force F12, disconnector blade 1002A has a total resultant force F21, disconnector blade 1002B has a total resultant force F22, disconnector blade 1003A has a total resultant force F31, and disconnector blade 1003B has a total resultant force F32.

Table 1 is based on electromagnetic simulation of the condition shown in FIG. 3, where 31 kA flows into disconnector blades 1001A,1001B, 1002A, 1002B, and 62 kA flows out of disconnector blades 1003A,1003B. In Table 1, the Lorentz force and the constriction force are added together to arrive at the total force on each disconnector blade. The units of each force are in Newtons (N). The directions of each force correspond to the arrows shown in FIG. 3. For example, a positive force value repels a disconnector blade from contact and a negative force value pushes the disconnector blade toward contact.

TABLE 1

EM simulation showing Lorentz forces, constriction forces, and total resultant forces for each disconnector blade

| Force on Blade | Lorentz Force (N) | Constriction Force (N) | Total Force (N) |
| --- | --- | --- | --- |
| F11 | −285 | 171 | −114 |
| F12 | −224 | 171 | −53 |
| F21 | 103 | 171 | 274 |
| F22 | −667 | 171 | −496 |
| F31 | −1458 | 684 | −774 |
| F32 | −754 | 684 | −70 |

As shown in Table 1, the total force F21 on disconnector blade 1002A has a positive value, meaning that the total force on the disconnector blade 1002A is repelling it away from its corresponding disconnector blade 1002B and its corresponding stab 130, thus placing the disconnector blade 1002B at risk of losing contact. With this issue, the switchgear may not pass a short circuit withstand test.

Figure 5:
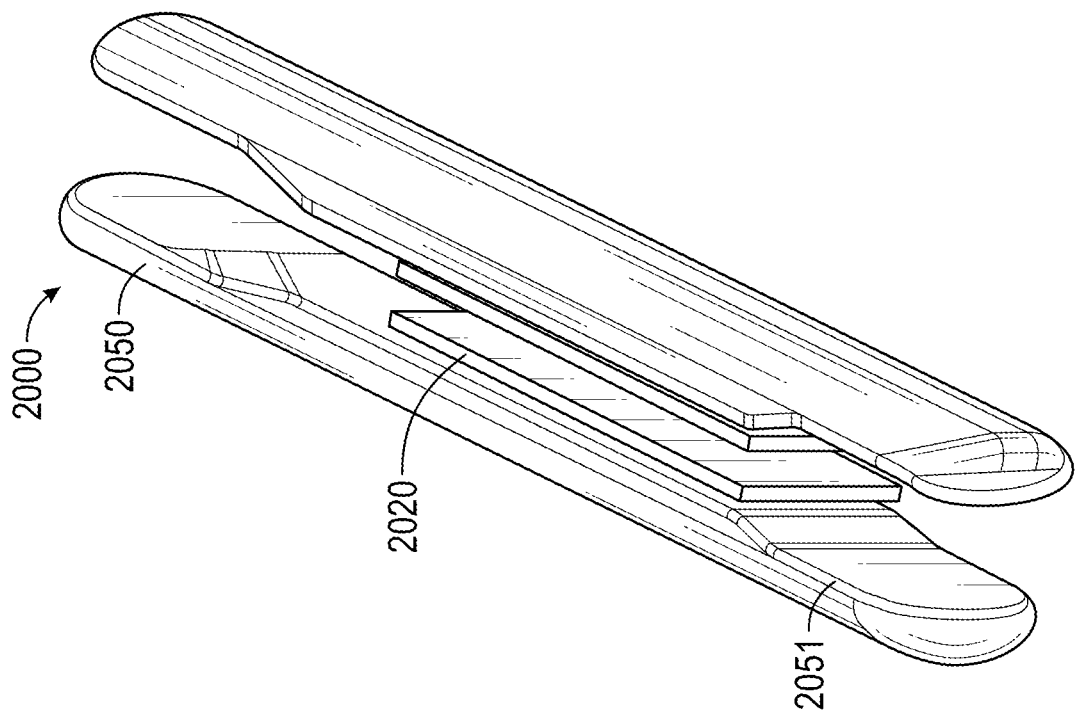
FIG. 5 is an isometric view of a pair of disconnector blades in accordance with an example embodiment of the disclosed concept.
Figure 4:
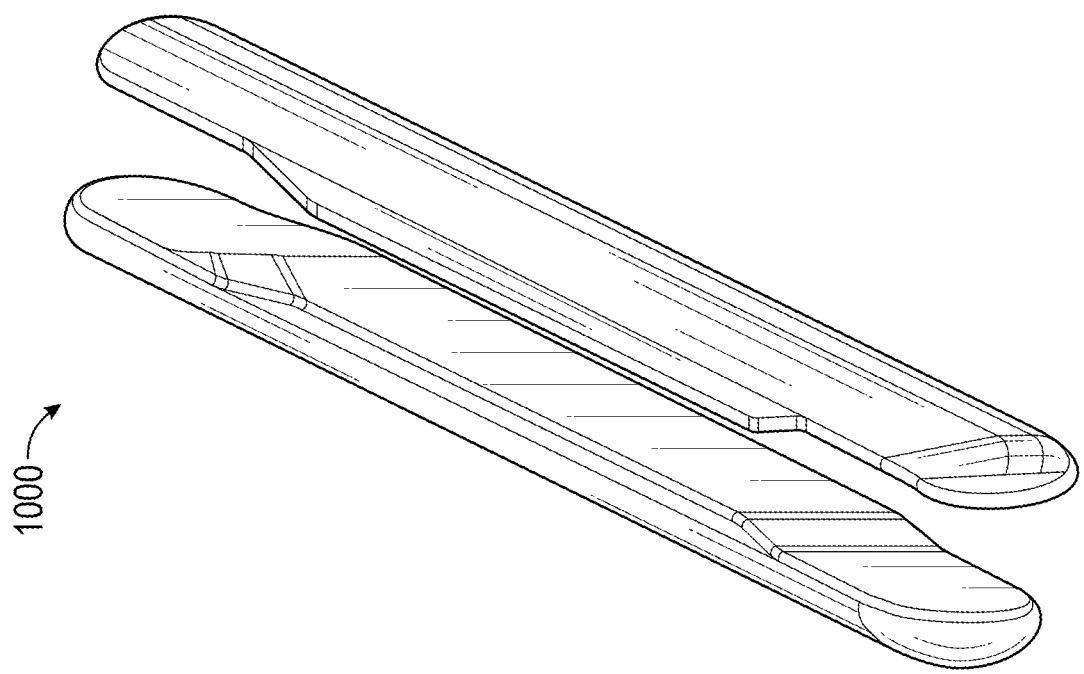
FIG. 4 is an isometric view of a conventional pair of disconnector blades.
Figure 6:
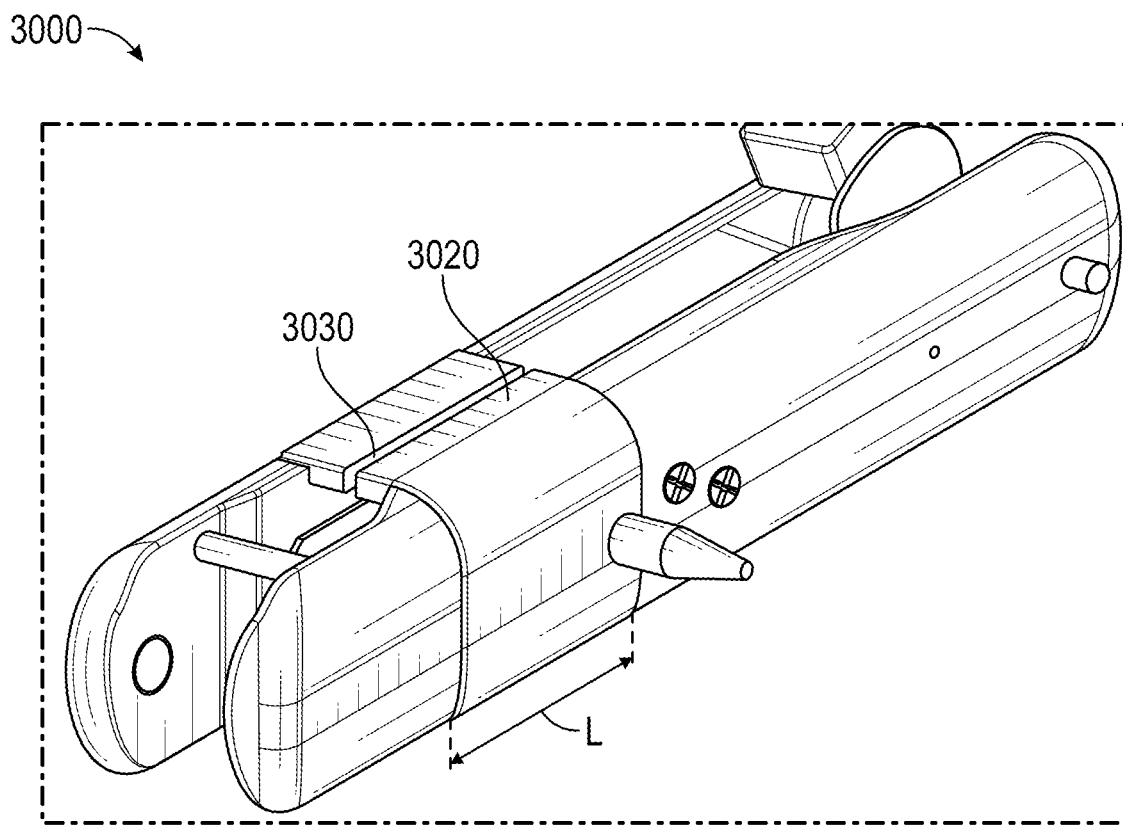
FIG. 6 is an isometric view of a pair of disconnector blades in accordance with another example embodiment of the disclosed concept.

FIG. 4 is an isometric view of the disconnector blades shown in FIGS. 2 and 3, and used in the simulation of Table 1. FIGS. 5 and 6 are isometric views of disconnector blades in accordance with example embodiments of the disclosed concept. As shown in FIG. 4, the disconnector blades 1000 are elongated members spaced apart by a distance. The stabs 130 are received between the disconnector blades 1000 at one end, and the other end may be electrically connected via a hinge.

Figure 11:
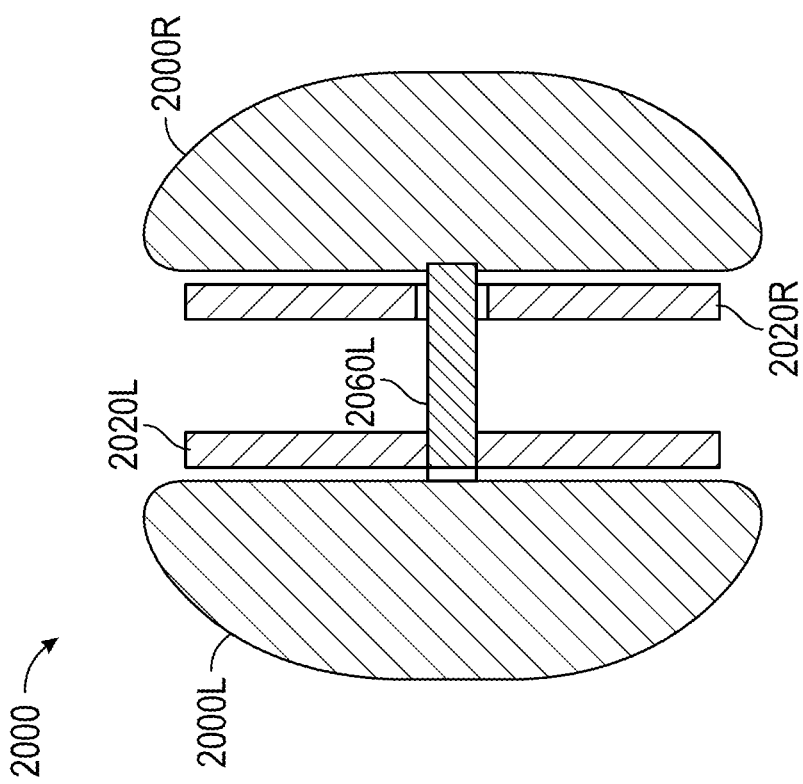
FIGS. 10-11 illustrate mechanical connections coupling magnetic plates and opposing disconnector blades in accordance with an example embodiment of the disclosed concept.
Figure 10:
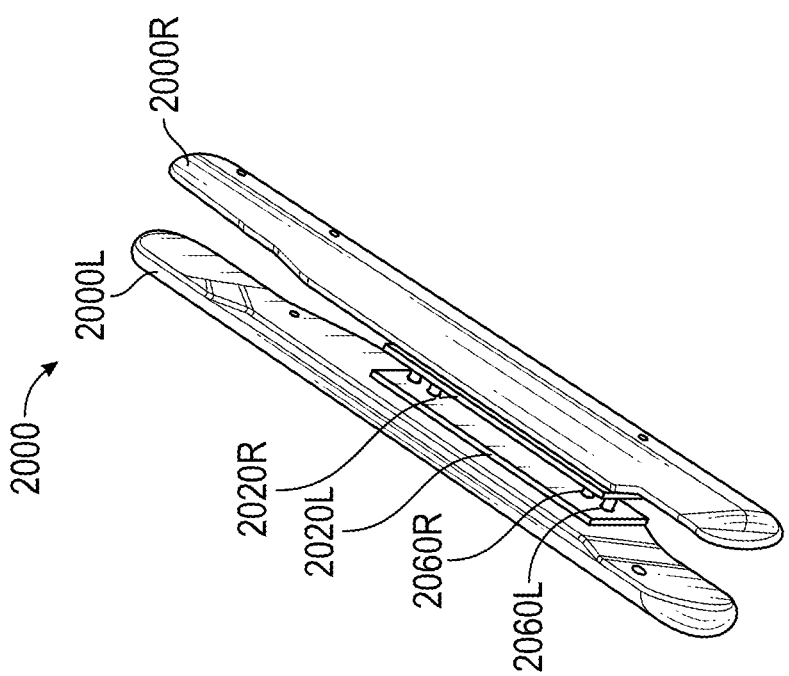

In accordance with an example embodiment of the disclosed concept, the disconnector blades 2000 shown in FIG. 5 have magnetic plates 2020 disposed on interior surfaces of the disconnector blades 2000. The disconnector blades 2000 otherwise have similar characteristics to the disconnector blades 1000. The magnetic plates 2020 are mechanically connected with opposite disconnector blades in order to provide additional holding force (i.e., a force pulling the disconnector blades together). For example, a left magnetic plate connects (e.g., without limitation, by being bolted) to a right disconnector blade via, e.g., without limitation, a pin, and a right magnetic plate connects to a left disconnector blade via another pin as shown in FIGS. 10 and 11. An additional attractive force is generated between the left magnetic plate and the left disconnector blade and this additional attractive force is transferred to the right disconnector blade through the mechanical link (e.g., the pin). Likewise, an additional force will be generated between the right magnetic plate and the right disconnector blade and the additional force is transferred to the left disconnector blade through the mechanical link. The additional attractive electromagnetic forces caused by the magnetic plates 2020 are proportional to the current flowing through the disconnector blades 2000, and thus, as the current flowing through the disconnector blades 2000 increases, the additional attractive forces also increase. Each magnetic plate 2020 is mechanically connected to an inner surface of a disconnector blade 2000. Specifically, the left disconnector blade connects to the right magnetic plate and the right disconnector blade connects to the left magnetic plate. The magnetic plate 2020 extends over a portion of the inner surface of the disconnector blade 2000 length-wise. The magnetic plate 2020 does not extend into either end 2050,2051 of the disconnector blades 2000 where electrical contacts are made. As such, the length of the magnetic plates 2020 is shorter than the length of the disconnector blades 2000, and may be selected based on the force required to maintain the disconnector blades 2000 to be held together during the high current. The magnetic plates 2020 mechanically connected to the inner surface of the disconnector blades 2000 increase the holding force between the disconnector blades 2000 significantly due to the attractive forces generated between the magnetic plates 2020 and the disconnector blades 2000. As shown below in Table 2, the holding force between the disconnector blades 2000 at 31 kA current is approximately 2024 N, which is almost twice as much as the holding force between the disconnector blades 1000. This additional holding force is sufficient to counter the risk of constriction force domination causing the disconnector blades 2000 to lose contact during a short circuit event.

In accordance with another example embodiment of the disclosed concept, the disconnector blades 3000 shown in FIG. 6 have a laminated steel 3020 substantially enclosing a portion of the disconnector blades 3000. The disconnector blades 3000 otherwise have similar characteristics to the disconnector blades 1000. The laminated steel 3020 substantially encloses a portion of the two disconnector blades 3000 with a gap 3030 (e.g., without limitation, 2 mm) in the center. The laminated steel 3020 does not cover the inner surface of the disconnector blades 3000. The laminated steel 3020 acts like a magnetic actuator (e.g., a coil) and creates an additional attractive force between the disconnector blades 3000 based on the current flowing through the disconnector blades 3000. The laminated steel 3020 may have a small length L (e.g., 10 mm along the disconnector blades 3000, covering a portion of the length of the disconnector blades 3000 while increasing the holding force between the blades 3000 significantly more than the holding force between the disconnector blades 1000. As shown in Table 2, the holding force between the blades 3000 at 31 kA current is approximately 5100 N, which is more than three times of the holding force between the disconnector blades 1000.

Table 2 lists the holding force (i.e., the force attracting a pair of disconnector blades together) at 31 kA for each of the disconnector blades 1000,2000,3000.

TABLE 2

Holding Force between Disconnector Blades at 31 KA current

| Blades | Holding Force at 31 kA current (N) |
|---|---|
| Baseline | 1160 |
| Baseline with Metal Plates | 2024 |
| Baseline with Laminated Steel | 5100 |

As shown in Table 2, the holding forces generated by the disconnector blades 2000,3000 in the example embodiments shown in FIGS. 5 and 6 are substantially increased over the holding forces of the disconnector blades 1000. This increased holding force counteracts the repulsive forces caused by the situation illustrated in FIG. 3, and thus eliminates the risk of disconnector blades losing contact during a short circuit event, and ensures that the switchgear will pass the short circuit withstand test.

Figure 7:
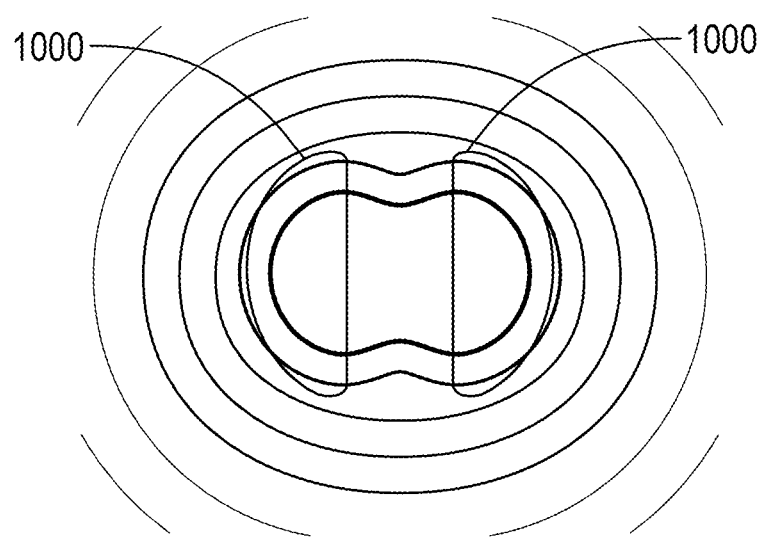
FIGS. 7-9 are schematic views of electromagnetic simulations of the disconnector blades of FIGS. 4-6.
Figure 8:
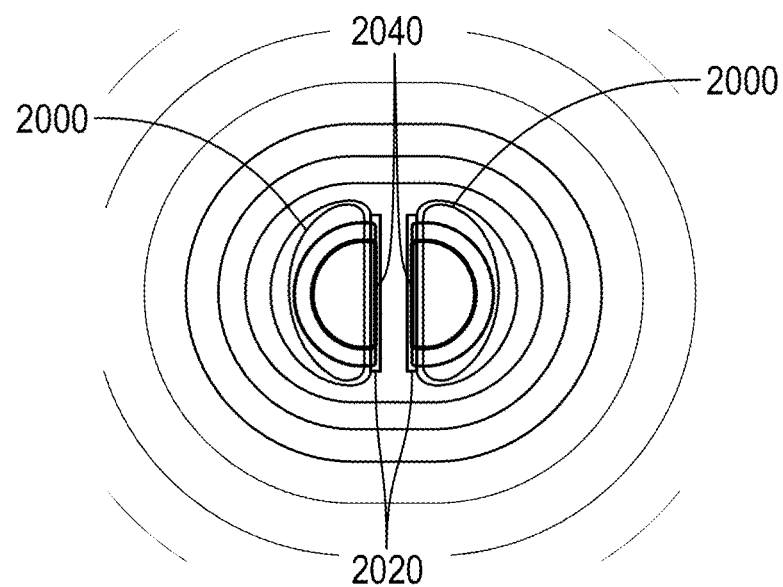
Figure 9:
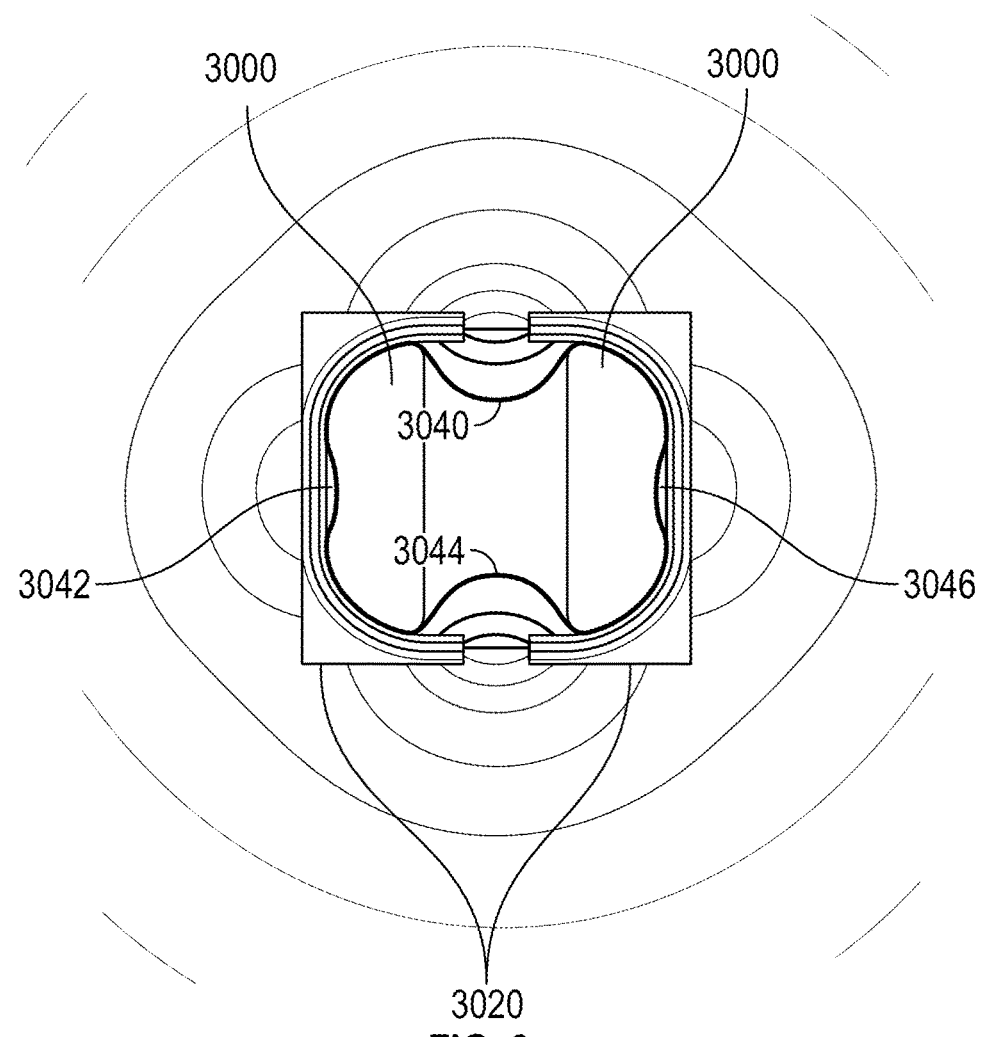

FIGS. 7-9 illustrate electromagnetic forces created when short current is passed via the disconnectors 100 according to example embodiments of the disclosed concept. FIG. 7 shows the electromagnetic (EM) forces created by the conventional disconnector blades 1000 when short circuit current is passed via the disconnector 100. Strength of the EM forces wanes as the EM field lines are further away from the disconnector blades, the strongest EM field having the darkest field lines and the weakest EM field having the lightest field lines. FIG. 8 shows the EM forces created by the disconnector blades 2000 with the magnetic plates 2020 mechanically coupled to the blades 2000. In FIG. 8, two holding forces 2040 have been generated between the magnetic plates 2020 and respective disconnector blades 2000. As shown in Table 2, the holding forces 2040 generated by the added magnetic plates 2020 increase the holding forces of the blades 2000 significantly (almost twice) from that of the conventional blades 1000. FIG. 9 shows the EM forces created by the disconnector blades 3000 including the laminated steel 3020. In FIG. 9, four different magnetic fields 3040 (at top of the disconnector blades 3000), 3042 (at an outer side surface of one of the disconnector blades 3000), 3044 (at bottom of the disconnector blades 3000), and 3046 (at an outer side surface of the other of the disconnector blades 3000) have been generated by the added laminated steel 3020 with stronger magnetic fields 3040,3044 between the disconnector blades 3000. As shown in Table 2, the holding forces between the disconnector blades 3000 are more than three-times the amount of the holding forces between the conventional baseline disconnector blades 1000. Thus, the example embodiments according to the disclosed concept substantially improve the disconnector performance without having to implement different types of contacts or adjusting the distance between the blades. Further, the example embodiments do not compromise the endurance or dielectric parameters associated with the disconnector 100 since the improvement is achieved by simply adding magnetic plates 2020 or incorporating a laminated steel 3020 over the conventional disconnector blades 1000.

FIGS. 10-11 illustrate mechanical connections coupling magnetic plates and opposing disconnector blades in accordance with an example embodiment of the disclosed concept. FIG. 10 is an isometric view of a pair of example disconnector blades 2000L,2000R including magnetic plates 2020L,2020R according to an example embodiment of the disclosed concept. Magnetic plates 2020L,2020R are mechanically coupled to the opposing disconnector blades 2000R,2000L. In FIG. 10, at one end of the magnetic plates, the left magnetic plate 2020L is mechanically coupled to the right disconnector blade 2000R via a pin 2060L, and the right magnetic plate 2020R is mechanically coupled to the left disconnector blade 2000L via another pin 2060R arranged next to the pin 2060L. There is another pair of pins mechanically connecting the magnetic plates and the opposing disconnector blades at the other end of the magnetic plates. FIG. 11 is a cross-sectional view of a pair of example disconnector blades 2000L,2000R including magnetic plates 2020L,2020R according to an example embodiment of the disclosed concept. In FIG. 11, the left magnetic plate 2020L is mechanically coupled to the right disconnector blade 2000R via a pin 2060L. The pin 2060L extends from the left magnetic plate 2020L to the right disconnector blade 2000R, penetrates the right disconnector blade 2000R, and returns to the left magnetic plate 2020L in a U-shaped manner. While FIG. 11 only shows the mechanical connection between the left magnetic plate 2020L and the right disconnector blade 2000R, it will be understood that the right magnetic plate 2020R and the left disconnector blade 2000L are mechanically connected to each other similarly.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A disconnector for use in a switchgear structured to electrically connect between a power source and a load, the disconnector comprising:
    a pair of disconnector blades spaced apart by a distance and having a first end structured to selectively receive and form an electrical connection with a busbar contact and a second end structured to electrically couple to the load; and
    a pair of magnetic plates mechanically connected to inner surfaces of the pair of disconnector blades and structured to bias the pair of disconnector blades toward each other.

2. The disconnector of claim 1, wherein each magnetic plate is mechanically connected to an opposite disconnector blade of the pair of the disconnector blades.

3. The disconnector of claim 2, wherein each magnetic plate is mechanically connected to the opposite disconnector blade via a pin.

4. The disconnector of claim 3, wherein an attractive force is generated between each magnetic plate and a disconnector blade arranged adjacent to the magnetic plate, and the attractive force is transferred to the opposite disconnector blade via the mechanical connection comprising the pin.

5. The disconnector of claim 1, wherein the magnetic plates extend length-wise over the inner surfaces of the pair of disconnector blades.

6. The disconnector of claim 1, wherein the magnetic plates do not extend over the first end and the second end.

7. The disconnector of claim 1, wherein the disconnector is a three-phase disconnector and each phase includes a corresponding pair of disconnector blades.

8. The disconnector of claim 7, wherein each disconnector blade interacts with remaining five disconnector blades of the three-phase disconnector.

9. The disconnector of claim 8, wherein each disconnector blade has a total force based at least in part on holding forces between the pair of disconnector blades, constriction forces generated at the busbar contact and a contact at the second end, and forces caused by disconnector blades in other phases.

10. The disconnector of claim 9, wherein the magnetic plates bias the pair of disconnector blades toward each other based at least in part on additional holding forces generated between the magnetic plates and the pair of disconnector blades.

11. A disconnector for use in a switchgear structured to electrically connect between a power source and a load, the disconnector comprising:
    a pair of disconnector blades spaced apart by a distance and having a first end structured to selectively receive and form an electrical connection with a busbar contact and a second end structured to electrically couple to the load; and
    a laminated steel disposed to enclose the pair of disconnector blades with a gap at a center and structured to bias the pair of disconnector blades toward each other.

12. The disconnector of claim 11, wherein the laminated steel has a small length covering a fraction of length of the disconnector blades.

13. The disconnector of claim 12, wherein the laminated steel encloses a fraction of the disconnector blades.

14. The disconnector of claim 11, wherein the laminated steel does not enclose inner surface of each disconnector blade.

15. The disconnector of claim 11, wherein the gap narrows the distance between the pair of disconnector blades at a top of the pair of disconnector blades and a bottom of the pair of the disconnector blades.

16. The disconnector of claim 11, wherein the disconnector is a three-phase disconnector, each phase includes corresponding pair of disconnector blades, and each disconnector blade has a total force based at least in part on holding forces between the pair of disconnector blades, constriction forces generated at the busbar contact and a contact at the second end, and forces caused by disconnector blades in other phases.

17. The disconnector of claim 16, wherein the laminated steel is structured to generate additional holding forces for the pair of the blades.

18. The disconnector of claim 17, wherein the additional holding forces include four different electromagnetic fields comprising a first electromagnetic field between the pair of disconnector blades at a top of the pair of disconnector blades, a second electromagnetic field between the pair of disconnector blades at a bottom of the pair of disconnector blades, a third electromagnetic field at an outer side surface of one blade of the pair of disconnector blades, and a fourth electromagnetic field at an outside side surface of an other blade of the pair of disconnector blades.

19. The disconnector of claim 18, wherein the third electromagnetic field and the fourth electromagnetic field each are stronger than the first electromagnetic field or the second electromagnetic field.

20. The disconnector of claim 11, wherein the second end is coupled to the load via a vacuum interrupter.

* * * * *